United States Patent
Wu et al.

(10) Patent No.: US 9,276,699 B2
(45) Date of Patent: Mar. 1, 2016

(54) ERROR CONTROL IN A COMMUNICATION SYSTEM

(75) Inventors: Chunli Wu, Beijing (CN); Benoist Pierre Sebire, Tokyo (JP)

(73) Assignee: Nokia Solutions and Networks Oy, Espoo (FI)

(*) Notice: Subject to any disclaimer, the term of this patent is extended or adjusted under 35 U.S.C. 154(b) by 81 days.

(21) Appl. No.: 13/978,934

(22) PCT Filed: Jan. 10, 2011

(86) PCT No.: PCT/EP2011/050199
§ 371 (c)(1),
(2), (4) Date: Jul. 10, 2013

(87) PCT Pub. No.: WO2012/095161
PCT Pub. Date: Jul. 19, 2012

(65) Prior Publication Data
US 2013/0329545 A1    Dec. 12, 2013

(51) Int. Cl.
*H04L 1/00* (2006.01)
*H04L 1/18* (2006.01)
*H04W 72/12* (2009.01)
*H04W 88/06* (2009.01)

(52) U.S. Cl.
CPC ............ *H04L 1/0025* (2013.01); *H04L 1/1825* (2013.01); *H04L 1/1877* (2013.01); *H04L 1/1887* (2013.01); *H04W 72/1215* (2013.01); *H04W 72/1236* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2009/0235139 A1* | 9/2009 | Park et al. | 714/750 |
| 2009/0245221 A1 | 10/2009 | Piipponen | 370/343 |
| 2010/0034158 A1* | 2/2010 | Meylan | 370/329 |
| 2010/0284360 A1* | 11/2010 | Dalsgaard et al. | 370/329 |
| 2010/0290420 A1* | 11/2010 | Dalsgaard et al. | 370/329 |
| 2010/0322097 A1* | 12/2010 | Jen | 370/252 |
| 2010/0322165 A1* | 12/2010 | Yoo | 370/329 |
| 2011/0092201 A1* | 4/2011 | Lindstrom et al. | 455/424 |
| 2011/0205928 A1* | 8/2011 | Pelletier et al. | 370/252 |
| 2011/0243047 A1* | 10/2011 | Dayal et al. | 370/311 |
| 2012/0140690 A1* | 6/2012 | Choi et al. | 370/311 |

(Continued)

FOREIGN PATENT DOCUMENTS

| CN | 201682620 U | 12/2010 |
|---|---|---|
| EP | 2 101 530 A1 | 9/2009 |
| WO | WO 2010/062864 A1 | 6/2010 |

OTHER PUBLICATIONS

3GPP TS 36.321 V10.0.0 (Dec. 2010), "3rd Generation Partnership Project; Technical Specification Group Radio Access Network; Evolved Universal Terrestrial Radio Access (E-UTRA); Medium Access control (MAC) protocol specification (Release 10)", 53 pgs.

*Primary Examiner* — Jeffrey M Rutkowski
*Assistant Examiner* — Ning Li
(74) *Attorney, Agent, or Firm* — Harrington & Smith

(57) ABSTRACT

A method and apparatus for controlling wireless communications by a multi-radio communication device is disclosed. An error control mechanism can be operated in accordance with a first mode of operation. Switching to a second mode of operation is provided in response to determining occurrence of a period of communication restrictions that is longer than a threshold. The error control mechanism is then operated in accordance with the second mode of operation during the period.

17 Claims, 4 Drawing Sheets

(56) References Cited

U.S. PATENT DOCUMENTS

| | | | |
|---|---|---|---|
| 2012/0155437 A1* | 6/2012 | Kuo | 370/336 |
| 2012/0164948 A1* | 6/2012 | Narasimha et al. | 455/63.1 |
| 2012/0182958 A1* | 7/2012 | Pelletier et al. | 370/329 |
| 2012/0314569 A1* | 12/2012 | Liu et al. | 370/230 |
| 2014/0269397 A1* | 9/2014 | Pelletier et al. | 370/252 |

* cited by examiner

ERROR CONTROL IN A COMMUNICATION SYSTEM

This disclosure relates to controlling wireless communications by a multi-radio communication device, and more particularly to operating an error control mechanism for wireless communications by a multi-radio communication device.

A communication system can be seen as a facility that enables communication sessions between two or more entities such as fixed or mobile communication devices, base stations, servers and/or other communication nodes. A communication system and compatible communicating entities typically operate in accordance with a given standard or specification which sets out what the various entities associated with the system are permitted to do and how that should be achieved. In a wireless communication system at least a part of the communication between at least two stations occurs over a wireless interface between at least two stations. Examples of wireless systems include public land mobile networks (PLMN) such as cellular networks, satellite based communication systems and different wireless local networks, for example wireless local area networks (WLAN). A wireless radio connection can also be provide by short range radio, for example based on the Bluetooth™ radio.

An example of wireless communication systems is an architecture that is being standardized by the 3rd Generation Partnership Project (3GPP). This system is often referred to as the long-term evolution (LTE) of the Universal Mobile Telecommunications System (UMTS) radio-access technology. A further development of the LTE is often referred to as LTE-Advanced. The various development stages of the 3GPP LTE specifications are referred to as releases.

Communications in a communication system can be between appropriate communication devices. In wireless systems a communication device provides a transceiver station that can communicate with another communication device such as e.g. base stations of access networks and/or other user equipments. A communication device of a user is often referred to as user equipment (UE) or terminal. A communication device is provided with an appropriate signal receiving and transmitting arrangement for enabling communication of data and signaling with other parties.

A communication device can be provided with a multiple of radios in order to allow users to access various networks and services ubiquitously. For example, a communication device can be equipped with multiple radio transceivers. In accordance with a more particular example a user equipment may be equipped with a cellular radio (e.g. LTE), WiFi™, and Bluetooth™ transceivers, and global navigation satellite system (GNSS) receivers. This can result problems in view of interference, and more particularly, coexistence interference between those collocated radio transceivers. In-device coexistence interference can occur for example when transmitting in one frequency band interferes with receiving in another, within the same user equipment.

In packet data systems data packets may be lost and/or received incorrectly. Mechanisms for ensuring that packets, or at least a sufficient amount of the data that was sent is received, have been developed. Examples of error control mechanisms include automatic repeat request (ARQ) and hybrid automatic repeat request (Hybrid ARQ or HARQ). Hybrid automatic repeat request is a combination of forward error-correcting coding and error detection using the ARQ error-control method. HARQ based error detection and correction operation is believed to enable faster recovery from errors by storing corrupted packets in the receiving device rather than discarding them. Even if retransmitted packets have errors, a good packet can be derived from the combination of bad ones. A part of the methods is feedback by means of acknowledgements of received packets. The feedback can be positive (ACK) or negative (NACK).

Gaps in transmission and/or reception gap may occur for various reasons. For example, transmissions may not be allowed during measurements. A measurement gap can be provided to allow a user equipment to make inter-frequency and inter-RAT (radio access technology) measurements. Inter-RAT measurements typically refer to measurements on downlink physical channels belonging to another radio access technology. With the exception of the random access channel (RACH) procedure that has a priority when started, no dedicated TX/RX activity should take place in a serving cell during a measurement gap.

Periods when communications is restricted, for example the measurement gaps can disturb uplink HARQ operation in various ways, in particular when HARQ feedback cannot be received and/or uplink transmissions cannot be made during the gaps. Therefore, for example LTE HARQ operation from release 8 onwards already takes into account the occurrence of measurement gaps.

Long periods when transmission is restricted or prevented altogether may cause loss of data packets and/or non-optimal functioning of the error control mechanism. For example, in certain scenarios long gaps may force an unwanted flush of HARQ buffers and/or non-adaptive retransmission of packets. Flushing of HARQ buffers may also become unpredictable in applications where flushing is triggered based on a count of retransmissions.

Embodiments of the invention aim to address one or several of the above issues. It is noted that the above discusses only examples, and the issues are not limited to any particular communication system, standard, specification, radios and so forth, but may occur in any communication device and/or system where in-device interference may be caused by multiple of radios.

In accordance with an embodiment there is provided a method of controlling wireless communications by a multi-radio communication device, the method comprising operating an error control mechanism in accordance with a first mode of operation, switching to a second mode of operation in response to determining occurrence of a period of communication restrictions that is longer than a threshold, and operating the error control mechanism in accordance with the second mode of operation during the period.

In accordance with an embodiment there is provided an apparatus for controlling an error control mechanism for wireless communications by a multi-radio communication device, the apparatus comprising at least one processor, and at least one memory including computer program code, wherein the at least one memory and the computer program code are configured, with the at least one processor, to operate the error control mechanism in accordance with a first mode of operation, switch to a second mode of operation in response to determining occurrence of a period of communication restrictions that is longer than a threshold, and operate the error control mechanism in accordance with the second mode of operation during the period.

In accordance with a more detailed embodiment the error control mechanism comprises a hybrid automatic repeat request (HARQ).

The second mode of operation can comprise controlling flushing of at least one error control mechanism buffer such that the flushing of the buffer is prevented during the period. According to another embodiment the flushing is always performed during the period. According to a possibility the second mode of operation can comprise freezing a count of transmissions during a period when transmissions by the communication device are not allowed and/or setting a feedback variable to a positive acknowledgement (ACK) if the period extends over at least a predefined number of round-trip time periods. Increments of the count of transmissions may be frozen during a period when physical uplink shared channel (PUSCH) transmissions are not allowed.

The period of communication restrictions can comprise a measurement gap.

A determination that the period of communication restrictions exceeds a predefined threshold can be made. The threshold may be configured by means of radio resource control.

The determining of occurrence of the period of communication restrictions may comprise determining a period of in-device coexistence interference avoidance. According to a possibility the determining of occurrence of the period of communication restrictions may be based on scheduling of measurement gaps.

The switching between the modes may be performed in a a mobile communication device and/or a base station. A communication device and/or base station comprising a control apparatus configured to provide at least one of the embodiments can also be provided. The communication device may comprise a multi-radio user equipment.

A computer program comprising program code means adapted to perform the herein described methods may also be provided. In accordance with further embodiments apparatus and/or computer program product that can be embodied on a computer readable medium for providing at least one of the above methods is provided.

Various other aspects and further embodiments are also described in the following detailed description of examples embodying the invention and in the attached claims.

The invention will now be described in further detail, by way of example only, with reference to the following examples and accompanying drawings, in which.

In the following certain exemplifying embodiments are explained with reference to a wireless or mobile communication system serving mobile communication devices. Therefore, before explaining in detail the exemplifying embodiments, certain general principles of a wireless communication system, components thereof, and mobile communication devices are briefly explained with reference to FIGS. 1 to 4 to assist in understanding the technology underlying the described examples.

Figure 1:
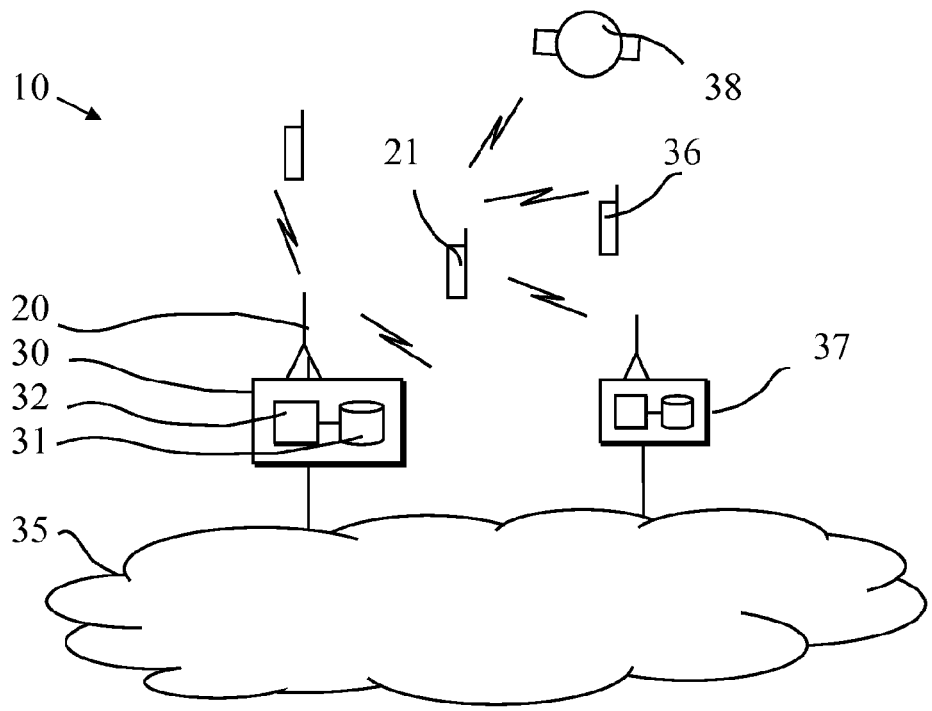
FIG. 1 shows an example of a communication system wherein below described examples of the invention may be implemented.

A mobile communication device 21 is typically provided wireless access via at least one base station or similar wireless transceiver node of an access system. An access system may be provided by a cell of a cellular system or another system enabling a communication device to access a communication system. Therefore an access system is hereinafter referred to as a radio service area or cell. In FIG. 1 base station 20 provides a radio service area of a cellular system. However, it is noted that a great number of cellular radio service areas may be provided in a communication system and that a mobile communication device may simultaneously be located in a plurality of cellular service areas. Also, the base station site 20 can provide more than one cell and/or a plurality of sectors, for example three radio sectors, each sector providing a cell or a sub radio service area of a cell.

A base station 20 is typically controlled by at least one appropriate controller so as to enable operation thereof and management of mobile communication devices 21 in communication with the base station. The control apparatus can be interconnected with other control entities. In FIG. 1 a controller apparatus is shown to be provided by block 30. A base station control apparatus is typically provided with memory capacity 31 and at least one data processor 32. The control apparatus and functions may be distributed between a plurality of control units.

A non-limiting example of communication systems is the long-term evolution (LTE) of the Universal Mobile Telecommunications System (UMTS) that is being standardized by the 3rd Generation Partnership Project (3GPP). A LTE base station is known as NodeB (NB) in the vocabulary of the 3GPP specifications. LTE based systems can employ a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices.

Other examples of radio services with which the mobile 21 can access to include those provided by base stations of systems that are based on technologies such as wireless local area network (WLAN) and/or WiMax (Worldwide Interoperability for Microwave Access). Base station 37 is shown as an example of a local area networks. WLANs are sometimes referred to by WiFi™, a trademark that is owned by the Wi-Fi Alliance, a trade association promoting Wireless LAN technology and certifying products conforming to certain standards of interoperability.

In FIG. 1 example the base stations 20 and 37 are connected to a wider communications network 35. A controller may be provided for coordinating the operation of the access systems. A gateway function may also be provided to connect to another network via the network 35. The other network may be any appropriate network. A wider communication system may thus be provided by one or more interconnect networks and the elements thereof, and one or more gateways may be provided for interconnecting various networks.

The mobile communication device 21 may further communicate with for example another mobile device 36. This communication may be provided, for example, by means of Bluetooth™ connectivity. FIG. 1 also shows a satellite 38 with which the mobile device 21 may receive and/or receive and transmit radio signals. The satellite may be a satellite of a positioning system or of a satellite based communication system.

Figure 2:
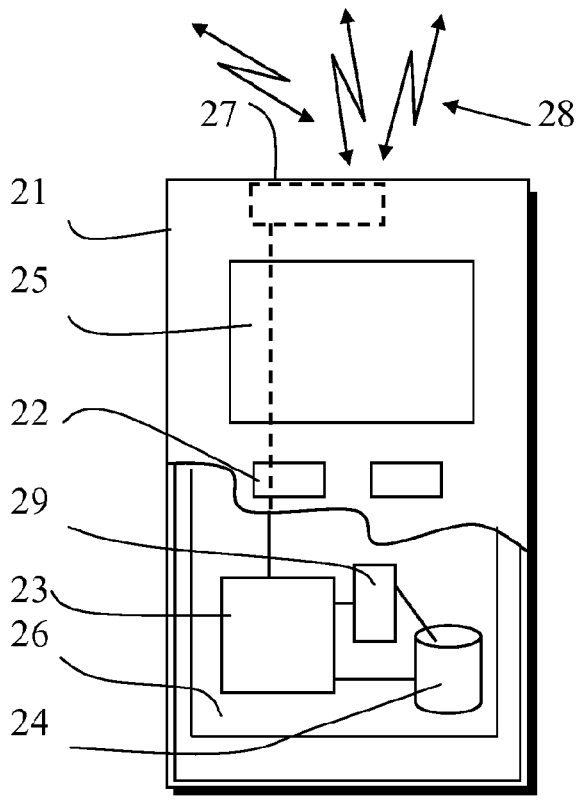
FIG. 2 shows an example of a communication device.

FIG. 2 shows a schematic, partially sectioned view of a communication device 21 that a user can use for communication. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia, positioning data, other data, and so on. Users may thus be offered and provided numerous services via their communication devices. Non-limiting examples of these services include two-way or multi-way calls, data communication or multimedia services or simply an access to a data communications network system, such as the Internet.

A mobile device is typically provided with at least one data processing entity 23, at least one memory 24 and other possible components 29 for use in software and hardware aided execution of tasks it is designed to perform, including control of access to and communications with base stations and other communication devices. The data processing, storage and other relevant control apparatus can be provided on an appropriate circuit board and/or in chipsets. This feature is denoted by reference 26. Control and memory functions provided by the control apparatus of the mobile device in view of operating an error control mechanisms and cause switching between different modes of operation in accordance with certain embodiments of the present invention will be described later in this description.

The user may control the operation of the mobile device by means of a suitable user interface such as key pad 22, voice commands, touch sensitive screen or pad, combinations thereof or the like. A display 25, a speaker and a microphone are also typically provided. Furthermore, a mobile communication device may comprise appropriate connectors (either wired or wireless) to other devices and/or for connecting external accessories, for example hands-free equipment, thereto.

The mobile device 21 may receive and transmit signals 28 via appropriate apparatus for receiving and transmitting signals. In FIG. 2 transceiver apparatus is designated schematically by block 27. The transceiver may be provided for example by means of a radio part and associated antenna arrangement. The antenna arrangement may be arranged internally or externally to the mobile device. A wireless communication device can be provided with a Multiple Input/Multiple Output (MIMO) antenna system. A more detailed example of a radio part is shown in FIG. 3.

In order to allow users to access various networks and services ubiquitously, a user equipment can be equipped with multiple radio transceivers. However, this can cause interference, and more particularly, coexistence interference between those collocated radio transceivers. In-device coexistence interference can occur for example when transmitting in one frequency band interferes with receiving in another, within the same user equipment. FIG. 3 shows an example of coexistence interference in a multi-radio device.

Due to the proximity of multiple radio transceivers within the same user equipment, the transmit power of one transmitter may be much higher than the received power level of another receiver. By means of filter technologies and sufficient frequency separation, the transmit signal may not result in significant interference. But for some coexistence scenarios, e.g. when different radio technologies operating on adjacent frequencies are used within the same user equipment, the state-of-the-art filter technology may not always provide sufficient interference rejection. Therefore, it may not be possible to solve the interference problem by a single generic radio frequency (RF) design may not always be possible.

Figure 3:
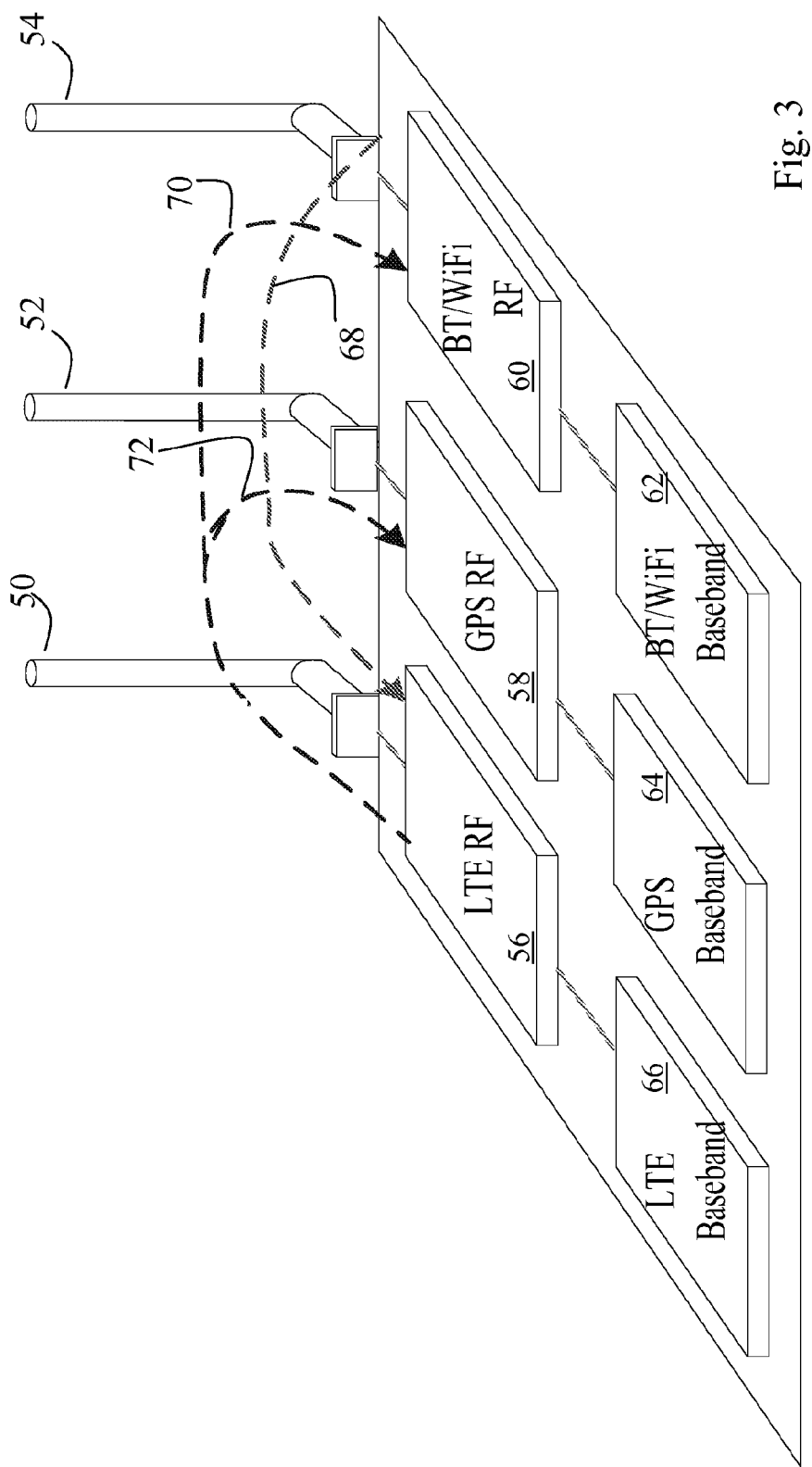
FIG. 3 shows an example of a multi-radio communication device.

FIG. 3 shows part of the device 21 in more detail. In this example, the device 21 has a first antenna 50, a second antenna 52 and a third antenna 54. The first antenna 50 is configured to transmit and receive LTE signals. The second antenna 52 is configured to receive GPS (global positioning system) signals. The third antenna 54 is configured to transmit and receive Bluetooth™ and/or Wi-Fi™ signals.

The first antenna 50 is connected to an LTE radio frequency processor 56 which is arranged to process the radio frequency signals. The LTE radio frequency processor 56 is coupled to an LTE baseband processor 66 which is arranged to process the radio frequency signals to convert those signals to the baseband and to process those signals. Similarly, the second antenna 52 is coupled to a GPS radio frequency processor 58, which is arranged to be coupled to the GPS baseband processor 64. Finally, the third antenna 54 is connected to a Bluetooth™/Wi-Fi™ radio frequency processor 60 which in turn is connected to the Bluetooth™/Wi-Fi™ baseband processor 62. It should be appreciated that when the respective antenna receives a radio frequency signal, that radio frequency signal is provided to the respective radio frequency processor. The radio frequency processor may carry out any suitable processes, for example, filtering the desired signal from the undesired signals and/or amplification. The processed radio frequency signal is then provided to the respective baseband processor for down-conversion to the baseband and further processing.

In the case of transmission, the baseband processors will receive the signals at the baseband and up-convert those signals to the radio frequency. Other processing may be carried out by the baseband processors. Those radio frequency signals are then passed to the respective radio frequency processor.

The processing carried out by the respective blocks can be performed by a single block or processor, or by more than two blocks or processors. The division of the processes between the blocks can of course be changed. For example, the RF processing block may, for example, in some embodiments perform the baseband conversion, at least one of converting down to the baseband or up-converting to the radio frequency. Separate processors and/or antennas may be provided in some embodiments for uplink and downlink. In some embodiments, at least one processor may be used for two or more different types of signal received from and/or to be transmitted by two or more antennas.

It should be appreciated that in some embodiments, the GPS blocks may only need to receive signals.

It is possible that when LTE and ISM (which includes Bluetooth™ and WLAN technology) capabilities are provided in a single device, the LTE and ISM radio within the same device may be working on adjacent frequencies. For example, the LTE may be working on the upper part of band 40 (2300-2400 MHz) and the ISM may be working in the example 2450 MHz band. This type of coexistence may cause interference. This interference between the different frequencies is schematically shown in FIG. 3 by arrowed dashed lines 68 and 70.

Figure 4:
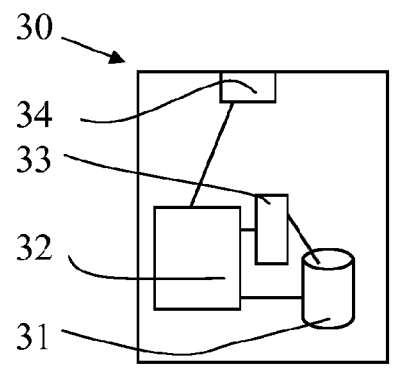
FIG. 4 shows an example of controller apparatus for a base station.

FIG. 4 shows an example of a control apparatus 30 for a communication system, for example to be coupled to and/or for controlling a station of a radio service area, for example one of the base stations 20 or 37 of FIG. 1. The control apparatus 30 can be arranged to provide control on communications by mobile communication devices that are in the service area. The control apparatus 30 can be configured to provide control functions in association with generation and communication of information regarding operation of an error control mechanism, for example HARQ based error detection and correction. The control apparatus can control use of different modes of operation of the error control mechanism and/or switching between the modes and other related information and for coordination of communications in accordance with certain embodiments described below. For providing the control the control apparatus 30 comprises at least one memory 31, at least one data processing unit 32, 33 and an input/output interface 34. Via the interface the control apparatus can be coupled to receiver and transmitter apparatus of a base station. The control apparatus 30 can be configured to execute an appropriate software code to provide the control functions.

Control operations comprise measurements. Measurements can be provided by a communication device, for example user equipment 21, during measurement gaps. In LTE a measurement gap is 6 ms in the downlink (DL) and 7 ms in the uplink (UL). The measurement gaps occur in the LTE with a periodicity of 40 or 80 ms. The measurement gap can disturb UL HARQ operation in various ways, and thus the LTE HARQ already takes into account the occurrence of gaps by not allowing reception of HARQ feedback and/or uplink transmissions during the gaps.

Figure 5:
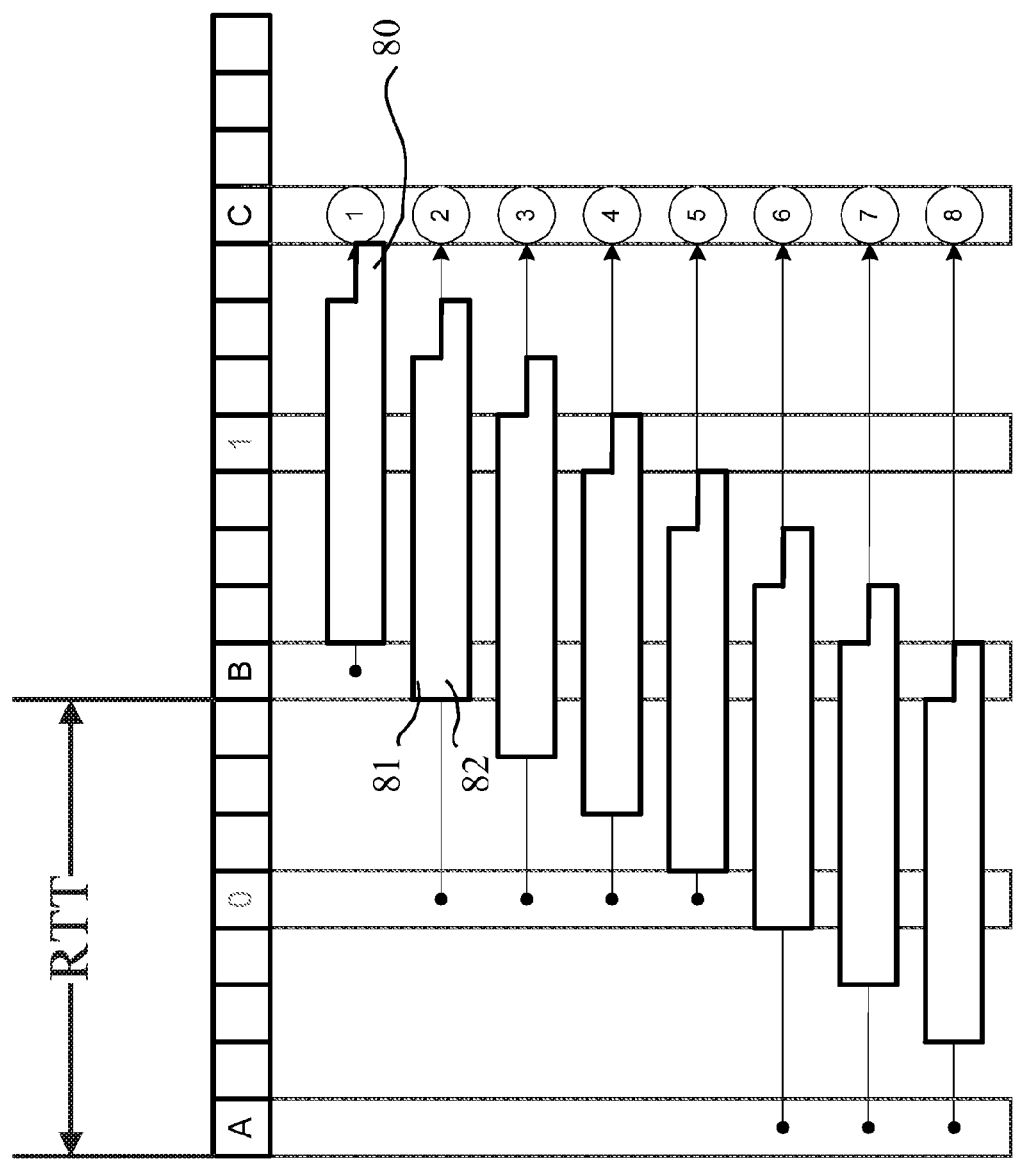
FIG. 5 shows an example of periods where communications are restricted.

The current HARQ operation for LTE is defined in 3GPP ($3^{rd}$ Generation Partnership Project) Technical Specification (TS) 36.321 version 10.0.0 "Evolved Universal Terrestrial Radio Access (E-UTRA); Medium Access Control (MAC) protocol specification (Release 10)" of December 2010. In accordance with the standard, LTE uplink supports synchronised adaptive and non-adaptive HARQ retransmission. An adaptive retransmission is performed on a resource indicated by a grant. With nonadaptive retransmission the retransmission is performed on the same resource and does not require a new grant. However, when Physical Uplink Shared Channel (PUSCH) transmission or feedback reception overlaps with a measurement gap, the user equipment behaviour can be currently restricted. For example, for a first transmission and adaptive retransmission, the state of HARQ feedback can always be set to NACK. When no uplink shared channel (UL-SCH) transmission can be made due to a measurement gap, no HARQ feedback can be received and a non-adaptive retransmission would follow. HARQ feedback reception can be restricted such that if UL-SCH transmission is made but there is a measurement gap at the time of the HARQ feedback reception for the transmission the HARQ feedback state is currently always set to ACK. A restriction for HARQ feedback transmission in a subframe that is part of a measurement gap is that the user equipment shall not perform the transmission of HARQ feedback and Channel Quality Indicator/Precoding Matrix Index/Rank Indicator (CQI/PMI/RI), and Sounding Reference Symbols (SRS) shall not be reported. Thus, if the HARQ feedback cannot be received ACK is assumed and adaptive retransmission can be resumed by physical downlink control channel (PDCCH) uplink (UL) grant. In FIG. 5 this is illustrated by point 0 or 1 (see $5^{th}$ or $13^{th}$ subframe of the frames) for HARQ feedback analysis of measurement gaps 1,6,7,8. If the UL transmission cannot be made a non-adaptive retransmission follows the gap. This occurs in point B (9th subframe) for feedback analysis of measurement gaps 2,3,4,5 in FIG. 5. It is noted that in the blocks 80 illustrating the measurement gaps the upper part 81 denotes downlink measurement gap consisting of 6 subframes and the lower part 82 denotes uplink measurements consisting of 7 subframes.

One of the recent proposals for avoidance of in-device coexistence interference is for the user equipment to inform the E-UTRAN when transmission/reception of LTE or other radio signal would benefit or no longer benefit from LTE not using certain carriers or frequency resources. Judgment by the user equipment can be taken as a baseline approach for a Frequency Domain Multiplexing (FDM) solution where the user equipment can indicate which frequencies are (or are not) usable due to in-device coexistence interference. In response to such a signaling, an eNB can order the user equipment to perform a handover to a frequency that has not been reported by the user equipment as suffering from in-device coexistence interference.

A time domain multiplexing (TDM) solution can also be used for avoidance of in-device coexistence interference, for example when FDM is not possible. In the TDM scheduled and unscheduled periods are alternated on the problematic frequencies. Scheduling or scheduled period can then be understood as a period during which the LTE user equipment may be scheduled to transmit or receive. Unscheduled period refers to a period during which the LTE user equipment is not scheduled to transmit or receive, thereby allowing the industrial, scientific and medical (ISM) band radio to operate without interference.

Each HARQ process is associated with a HARQ buffer. A HARQ buffer can be provided both in the user equipment and the base station. In the context of the uplink transmission example the relevant buffer is provided in the user equipment. Each HARQ process maintains a state variable which indicates the number of transmissions that have taken place for data, for example the Medium Access Control Packet Data Unit (MAC PDU) currently in the buffer. The state variable indicative of the number of transmissions that have already taken place can be referred as CURRENT TX NB. The same can be indicated by the number of retransmissions (retx). When a HARQ process is established, the retransmission indicator can be initialized to 0. A second state variable indicating the HARQ feedback for the MAC PDU currently in the buffer can also be maintained. This state variable can be termed HARQ FEEDBACK.

FIG. 5 shows also a round-trip time (RTT) period consisting of 8 subframes, or 8 ms. A round-trip time (RTT) can be defined for the HARQ and can be considered as consisting of the length of time it takes for a signal to be sent and the length of time it takes for an acknowledgment of that signal to be received. As mentioned above, in the LTE the measurement gap is 6 ms (6 subframes) for the downlink and 7 ms (7 subframes) for the uplink. A gap of this magnitude would only impact one round-trip time (RTT) period. However, the gap in TDM solutions for schemes such as in-device coexistence interference avoidance (ICO) can be longer than one RTT, for example 15-100 ms. A gap of such length can impact HARQ operations in various ways. For example, in accordance with the LTE standard, when an uplink transmission collides with a measurement gap, CURRENT TX NB parameter count is increased even when no uplink transmissions are not possible. With long gaps spanning multiple RTTs, CURRENT TX NB may reach its allowed maximum, therefore triggering HARQ buffer flush. A nonadaptive retransmission after a long period is not optimal and thus not desired, in particular when considering possible changes in channel quality.

Figure 6:
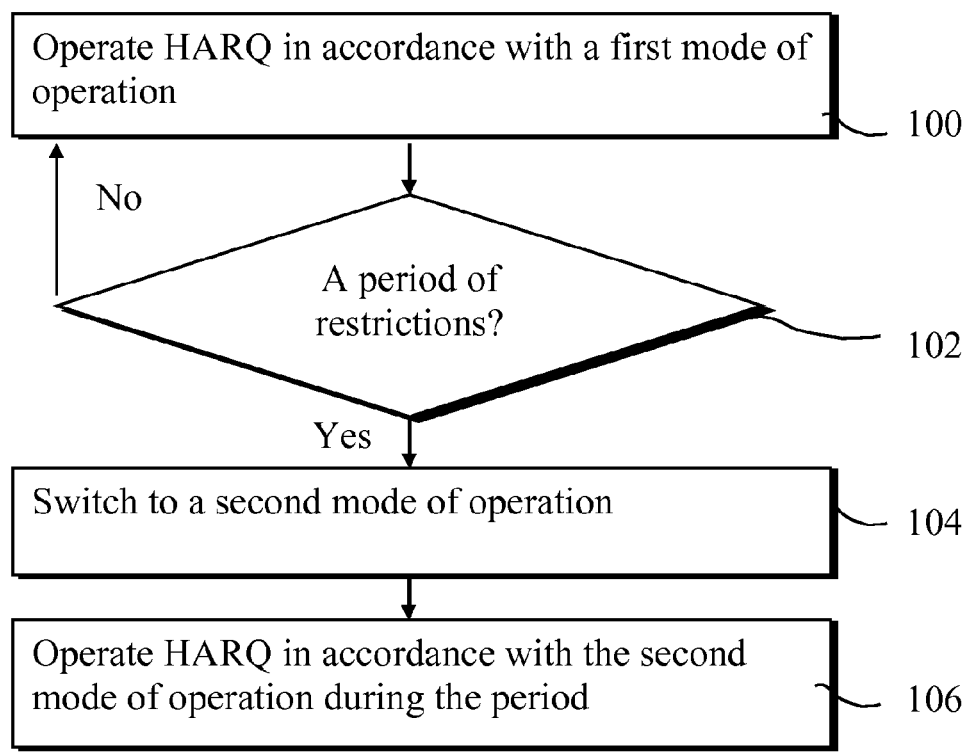
FIG. 6 is a flowchart illustrating an embodiment.

FIG. 6 illustrates an embodiment where error control operation, and more particularly, a HARQ operation is provided for wireless communications by a multi-radio communication device where possibility of communication restrictions of more than a predefined length, for example long measurements gaps is taken into account. In the embodiment HARQ operation is first operated in accordance with a first mode of operation at 100. In 102 occurrence of a period of communicating restrictions that is longer than a predefined threshold is determined. The determination may be based on, for example, information of scheduling of measurements gaps. In response to determining occurrence of such period the HARQ operation is switched to a second mode of operation at 104. HARQ operation is then operated at 106 in accordance with the second mode of operation during the period.

The second mode of operation may comprise at least one of freezing a count of transmissions during a period when transmissions by the communication device are not allowed, setting a feedback variable to a positive acknowledgement (ACK) if the period comprises at least a predefined number of roundtrip time periods, and flushing a feedback buffer during the period.

In accordance with an embodiment a different mode of uplink HARQ operation is used instead of a normal uplink HARQ operation when uplink transmission or HARQ feedback collides with a long gap. A long gap can comprise, for example, a measurement gap that is longer than one RTT. Switching from a normal, or first, mode to the different, or second, mode can be provided in response to detection that a gap that is longer than a predefined length is to occur. The switching can be provided by an entity that triggers the long gap. For example, this can be provided by a scheduler. Both the user equipment and the base station can provide the switching. For example, in the LTE uplink example a transmitter in the user equipment and a receiver in the eNB can be configured to provide switching between the modes.

The mode of operation used for long gaps can comprise at least one of the following possible operations:
(1) The indicator of the number of transmission or retransmissions is frozen during a measurement gap when transmissions cannot take place. For example, CURRENT TX NB is not incremented if physical uplink shared channel (PUSCH) transmission cannot take place during a gap. This kind of operation can be advantageously used to avoid unnecessary data loss.as the triggering of the HARQ buffer flush In accordance with the LTE standard can be avoided.
(2) The HARQ feedback variable is set to positive acknowledgement (ACK) if the gap extends over at least a predefined number of RTTs. For example, HARQ FEEDBACK is set to ACK if the number of RTTs covered is two. According to a possibility the threshold can be larger than two RTTs. This operation can be advantageously used to avoid undesired non-adaptive retransmissions that can otherwise take place in the normal mode operation in accordance with the LTE standard.

A combination of operations (1) and (2) can be used to avoid data loss and non-adaptive retransmissions.
(3) The UL HARQ buffer is flushed during long gaps. This option can also be used to avoid non-adaptive retransmissions. A benefit of this option is that the possibility of a flush does not depend on the length of the gap. Instead, the flush will always be performed, and thus the HARQ operation thereafter can always be provided based on a flushed buffer.

Such modes of operation or operations can be explicitly configured. The configuration can be provided by an upper layer, for example by radio resource control (RRC).

According to a possibility one or more of the operations is activated when the gap is for in-device coexistence interference avoidance (ICO) or the gap is longer than a certain threshold value. Both the user equipment and the base station/eNB are aware when an ICO gap occurs. Based on this knowledge both ends of the link can apply the different modes as appropriate.

The threshold can be specified by the relevant standard/specification. According to a possibility the threshold can be configured for example by a radio resource control (RRC) entity.

The required data processing apparatus and functions of a base station apparatus, a communication device and any other appropriate station or element may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for causing determinations of occurrence of the gaps and use of appropriate modes and configurations and communications of information between the various nodes. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that whilst embodiments have been described in relation to communications system such as those based on the LTE systems and 3GPP based systems and with relation to LTE HARQ and uplink on the PUSCH, similar principles can be applied to other communication systems and channels where in-device interference may occur. For example, this may be the case in application where no fixed station equipment is provided but a communication system is provided by means of a plurality of user equipment, for example in adhoc networks. Also, the above principles can also be used in networks where relay nodes are employed for relaying transmissions between stations. Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

The invention claimed is:
1. A method comprising:
operating an error control mechanism in accordance with a first mode of operation;

switching to a second mode of operation in response to determining occurrence of a period of communication restrictions that is longer than a threshold, wherein the threshold is at least the duration of a measurement gap, and wherein the second mode of operation comprises setting a feedback variable to a positive acknowledgement (ACK) when the period of communication restrictions extends over at least a predefined number of round-trip time periods; and operating the error control mechanism in accordance with the second mode of operation during the period of communication restrictions, wherein the method is a method of controlling wireless communications by a multi-radio communication device.

2. A method as claimed in claim 1, wherein the error control mechanism comprises a hybrid automatic repeat request (HARQ).

3. A method as claimed in claim 1, wherein the second mode of operation comprises controlling flushing of at least one error control mechanism buffer such that the flushing of the buffer is either prevented or always performed during the period.

4. A method as claimed in claim 1, wherein the second mode of operation further comprises:
freezing a count of transmissions during a period when transmissions by the communication device are not allowed.

5. A method as claimed in claim 4, wherein the freezing comprises freezing increments of the count of transmissions during a period when physical uplink shared channel (PUSCH) transmissions are not allowed.

6. A method as claimed in claim 1, wherein the period of communication restrictions comprises a measurement gap.

7. A method as claimed in claim 1, wherein the determining comprises determining a period of in-device coexistence interference avoidance.

8. A method as claimed in claim 1, wherein the communication restrictions comprise restrictions in uplink communications.

9. An apparatus comprising:
at least one processor; and
at least one memory including computer program code, wherein the at least one memory and the computer program code are configured, with the at least one processor:
operate an error control mechanism in accordance with a first mode of operation;

switch to a second mode of operation in response to determining occurrence of a period of communication restrictions that is longer than a threshold, wherein the threshold is at least the duration of a measurement gap, and wherein the second mode of operation comprises setting a feedback variable to a positive acknowledgement (ACK) when the period of communication restrictions extends over at least a predefined number of round-trip time periods; and operate the error control mechanism in accordance with the second mode of operation during the period, wherein the apparatus is an apparatus for controlling the error control mechanism for wireless communications by a multi-radio communication device.

10. An apparatus as claimed in claim 9, wherein the error control mechanism comprises a hybrid automatic repeat request (HARQ).

11. An apparatus as claimed in claim 9, wherein the second mode of operation is for controlling flushing of at least one error control mechanism buffer such that the flushing of the buffer is either prevented or always performed during the period.

12. An apparatus as claimed in claim 9, wherein the second mode of operation is for causing:
freezing a count of transmissions during a period when transmissions by the communication device are not allowed.

13. An apparatus as claimed in claim 12, wherein the freezing comprises freezing increments of the count of transmissions during a period when physical uplink shared channel (PUSCH) transmissions are not allowed.

14. An apparatus as claimed in claim 9, wherein the period of communication restrictions comprises a measurement gap.

15. An apparatus as claimed in claim 9, configured to cause switching between the modes of operation in response to information about a period of in-device coexistence interference avoidance.

16. An apparatus as claimed in claim 9, wherein the communication restrictions comprise restrictions in uplink communications.

17. A computer program product comprising a non-transitory computer-readable storage medium bearing computer program code embodied therein for use with a computer, the computer program code comprising code for performing the method according to claim 1.

* * * * *